US008468483B2

(12) United States Patent
Buck et al.

(10) Patent No.: US 8,468,483 B2
(45) Date of Patent: Jun. 18, 2013

(54) METHOD, SYSTEM AND PROGRAM STORAGE DEVICE FOR PERFORMING A PARAMETERIZED STATISTICAL STATIC TIMING ANALYSIS (SSTA) OF AN INTEGRATED CIRCUIT TAKING INTO ACCOUNT SETUP AND HOLD MARGIN INTERDEPENDENCE

(75) Inventors: Nathan C. Buck, Underhill, VT (US); Brian M. Dreibelbis, Underhill, VT (US); John P. Dubuque, Jericho, VT (US); Eric A. Foreman, Fairfax, VT (US); Peter A. Habitz, Hinesburg, VT (US); Jeffrey G. Hemmett, St. George, VT (US); Natesan Venkateswaran, Hopewell Junction, NY (US); Chandramouli Visweswariah, Croton-on-Hudson, NY (US); Xiaoyue Wang, Kanata (CA); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/279,373

(22) Filed: Oct. 24, 2011

(65) Prior Publication Data
US 2013/0104092 A1 Apr. 25, 2013

(51) Int. Cl.
*G06F 9/455* (2006.01)
(52) U.S. Cl.
USPC .......................................... 716/113; 716/134
(58) Field of Classification Search
USPC ................................................ 716/113, 134
See application file for complete search history.

(56) References Cited

U.S. PATENT DOCUMENTS

| 6,591,407 B1 | 7/2003 | Kaufman et al. |
| 7,278,126 B2 | 10/2007 | Sun et al. |
| 7,424,692 B1 | 9/2008 | Ravi |

(Continued)

FOREIGN PATENT DOCUMENTS

JP 7160757 A2 6/1995

OTHER PUBLICATIONS

Hatami et al., "Statistical Timing Analysis of Flip-Flops Considering Codependent Setup and Hold Times," GLSVLSI, May 2008, 6 pages.

(Continued)

*Primary Examiner* — Vuthe Siek
*Assistant Examiner* — Mohammed Alam
(74) *Attorney, Agent, or Firm* — Gibb & Riley, LLC; Richard M. Kotulak, Esq.

(57) ABSTRACT

In embodiments of a statistical static timing analysis (SSTA) method, system and program storage device, the interdependence between the setup time and hold time margins of a circuit block (e.g., a latch, flip-flop, etc., which requires the checking of setup and hold timing constraints) is determined, taking into account possible variations in multiple parameters (e.g., using a variation-aware characterizing technique). A parameterized statistical static timing analysis (SSTA) of a circuit incorporating the circuit block is performed in order to determine, in statistical parameterized form, setup and hold times for the circuit block. Based on the interdependence between the setup and hold time margins, setup and hold time constraints can be determined in statistical parameterized form. Finally, the setup and hold times determined during the SSTA can be checked against the setup and hold time constraints to determine, if the time constraints are violated or not and to what degree.

20 Claims, 8 Drawing Sheets

U.S. PATENT DOCUMENTS

| | | | |
|---|---|---|---|
| 7,487,475 B1* | 2/2009 | Kriplani et al. | 716/136 |
| 7,506,293 B2 | 3/2009 | Dasdan et al. | |
| 7,774,731 B2 | 8/2010 | Dasdan et al. | |
| 2007/0089076 A1 | 4/2007 | Amatangelo | |
| 2008/0209373 A1* | 8/2008 | Buck et al. | 716/6 |
| 2008/0295053 A1 | 11/2008 | Dasdan et al. | |
| 2009/0013294 A1 | 1/2009 | Visweswariah | |
| 2009/0249270 A1* | 10/2009 | Buck et al. | 716/6 |
| 2010/0180243 A1 | 7/2010 | Sinha et al. | |

OTHER PUBLICATIONS

Salman et al., "Exploiting Setup-Hold-Time Interdependence in Static Timing Analysis," IEEE Transactions on Computer-Aided Design of Integrated Circuits and Systems, vol. 26, No. 6, Jun. 2007, pp. 1114-1125.

Srivastava et al., "Interdependent Latch Setup/Hold Time Characterization via Euler-Newton Curve Tracing on State-Transition Equations," DAC 2007, San Diego, CA, pp. 136-141.

Salman et al., "Pessimism Reduction in Static Timing Analysis Using Interdependent Setup and Hold Times," IEEE Proceedings of the 7th International Symposium on Quality Electronic Design (ISQED), 2006, 6 pages.

Visweswariah et al., "First-Order Incremental Block-Based Statistical Timing Analysis," DAC Jun. 2004, pp. 331-336.

\* cited by examiner

METHOD, SYSTEM AND PROGRAM STORAGE DEVICE FOR PERFORMING A PARAMETERIZED STATISTICAL STATIC TIMING ANALYSIS (SSTA) OF AN INTEGRATED CIRCUIT TAKING INTO ACCOUNT SETUP AND HOLD MARGIN INTERDEPENDENCE

BACKGROUND

1. Field of the Invention

The embodiments disclosed herein relate to integrated circuit design and, more particularly, to a method, system and program storage device for performing a parameterized statistical static timing analysis (SSTA) of an integrated circuit taking into account setup and hold margin interdependence.

2. Description of the Related Art

In integrated circuit design, statistical static timing analysis (SSTA) can be used to predict the performance of an integrated circuit and verify that the integrated circuit will function correctly. Specifically, SSTA can be used to predict the arrival times of clock and data signals and the results can be compared against established timing constraints (i.e., timing requirements) to see if the integrated circuit, as designed, will function properly with a sufficiently high probability.

For example, in an integrated circuit, a circuit block (e.g., latch, flip-flop, clock gating block, register, static memory, dynamic memory, etc.) will typically have both a setup time margin and a hold time margin for capturing a data signal input. The setup time margin is a specific period of time immediately prior to the arrival of an active edge of a clock signal input during which the data signal input must be stable for the circuit block to function properly, whereas the hold time margin is a specific period of time immediately after the arrival of the active edge of the clock signal input during which the data signal input must continue to remain stable for the circuit block to function properly. In other words, for such a circuit block to function properly the actual setup time must be greater than the setup time margin and the actual hold time must be greater than the hold time margin. To ensure that this happens, setup and hold time constraints (i.e., timing requirements) are established for each circuit block within a circuit. During integrated circuit design, a statistical static timing analysis (SSTA) is typically performed to predict the setup time and hold time for each circuit block. Then, the results are compared to the established time constraints to determine if a violation will occur or not. Specifically, timing slack is computed and this timing slack is indicative of the degree to which a particular time constraint (i.e., a setup time constraint or a hold time constraint) is violated (i.e., negative slack) or not violated (i.e., positive slack). Thus, negative slack indicates how much the setup time or the hold time must be improved by design to avoid violating the particular time constraint, whereas positive slack indicates how much the setup time or hold time can be made worse by design (e.g., to save cost, power, etc.) without violating the particular time constraint.

Currently used techniques for establishing the time constraints (i.e., the timing requirements) for a circuit block, which requires the checking of setup and hold timing constraints, are conservative in order to ensure that the circuit block will function properly and, thereby, avoid circuit failure. However, because such techniques generally do not consider the interdependence between the setup time margin and the hold time margin of the circuit block and do not consider the impact of the range of possible variations in process, environmental or other parameters that can affect circuit performance (i.e., do not involve parameterized SSTA), the techniques have to impose sufficient additional pessimism to ensure that for all combinations of setup and hold time values and for all combinations of process and environmental parameters the circuit block will function properly. Therefore, there is a need in the art for a technique that can be used to establish more optimistic time constraints (i.e., less pessimistic time constraints) for a circuit block (e.g., latch, flip-flop, clock gating block, register, static memory, dynamic memory, etc., which requires checking of setup and hold timing constraints) by considering the interdependence between the setup time margin and the hold time margin of the circuit block as well as the impact on the circuit block of variations in process, environmental or other parameters affecting circuit performance.

SUMMARY

More particularly, disclosed herein are embodiments of a computer-implemented method for performing a parameterized statistical static timing analysis (SSTA) of an integrated circuit taking into account setup and hold margin interdependence. The method can comprise determining (e.g., by performing a characterization or other process) the interdependence between a setup time margin and a hold time margin of a circuit block (e.g., a latch, flip-flop, clock gating block, register, static memory, dynamic memory, etc.) taking into consideration variations in multiple parameters (e.g., multiple process, environmental or other parameters that affect circuit performance). Subsequently, a parameterized SSTA of a circuit, which incorporates this circuit block, can be performed. Based on the results of the parameterized SSTA, a setup time and a hold time for the circuit block can be determined, particularly, in parameterized statistical form. Based on the interdependence between the setup and hold time margins, setup and hold time constraints can be determined for the circuit block within the circuit. The setup and hold time constraints can also be in parameterized statistical form. The setup and hold times determined during the SSTA can be checked against the setup and hold time constraints to determine, for example, if the time constraints are violated or not and to what degree. Finally, timing yield can be determined, circuit optimization can be performed, etc. One technique for checking the setup and hold times against the setup and hold time constraints is to compute a combined setup and hold timing slack in statistical parameterized form, taking into account both the dependence of setup and hold times on process and environmental variations and the interdependence of setup and hold time margins. This combined statistical parameterized setup and hold timing slack can also be used for various other purposes (e.g., to determine timing yield, to perform circuit optimization, etc.).

Also disclosed herein are embodiments of a computer system for performing a parameterized statistical static timing analysis (SSTA) of an integrated circuit taking into account setup and hold margin interdependence. The system can comprise a memory and at least one processor. The memory can store a design of a circuit block (e.g., a latch, flip-flop, clock gating block, register, static memory, dynamic memory, etc.) and of a circuit incorporating that circuit block. The processor(s) can comprise at least a timing analysis tool and a design tool. The timing analysis tool can perform a parameterized SSTA of the circuit that incorporates this circuit block. Based on the results of the parameterized SSTA, the timing analysis tool can further determine, particularly, in parameterized statistical form, a setup time and a hold time for the circuit block. Based on a previously-determined interdependence between setup time margin and hold time margin of the circuit block, the timing analysis tool can further formulate, also in parameterized statistical form, a setup time constraint and a hold time constraint for the circuit block within the circuit. The timing analysis tool can check the setup time and hold time determined during the SSTA against the setup time constraint and the hold time constraint to determine, for example, if the setup time constraint and hold time constraint are violated or not and to what degree. Finally, the timing analysis tool can determine timing yield, a design tool can perform circuit optimization, etc. One technique that can be employed by the timing analysis tool for checking the setup and hold times against the setup and hold time constraints is to compute a combined setup and hold timing slack in statistical parameterized form, taking into account both the dependence of setup and hold times on process and environmental variations and the interdependence of setup and hold time margins. This combined statistical parameterized setup and hold timing slack can also be used for various other purposes (e.g., by the timing analysis tool to determine timing yield, by the design tool to perform circuit optimization, etc.).

Also disclosed herein are embodiments of a non-transitory program storage device. This program storage device can be readable by a computer and can tangibly embody a program of instructions executable by the computer to perform the above-described parameterized statistical static timing analysis (SSTA) method.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

The embodiments herein and the various features and advantageous details thereof are explained more fully with reference to the non-limiting embodiments that are illustrated in the accompanying drawings and detailed in the following description.

As mentioned above, in integrated circuit design, statistical static timing analysis (SSTA) can be used to predict the performance of an integrated circuit and verify that the circuit will function correctly. Specifically, SSTA can be used to predict the arrival times of clock and data signals and the results can be compared against established timing constraints (i.e., timing requirements) to see if the integrated circuit, as designed, will function properly with a sufficiently high probability.

Figure 1:
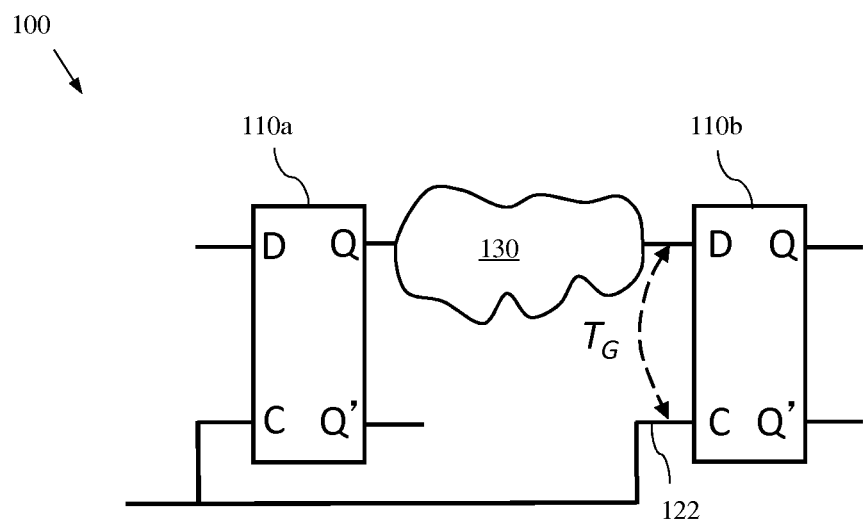
FIG. 1 is a schematic drawing illustrating an exemplary integrated circuit with a circuit block requiring checking of setup and hold timing constraints.
Figure 2:
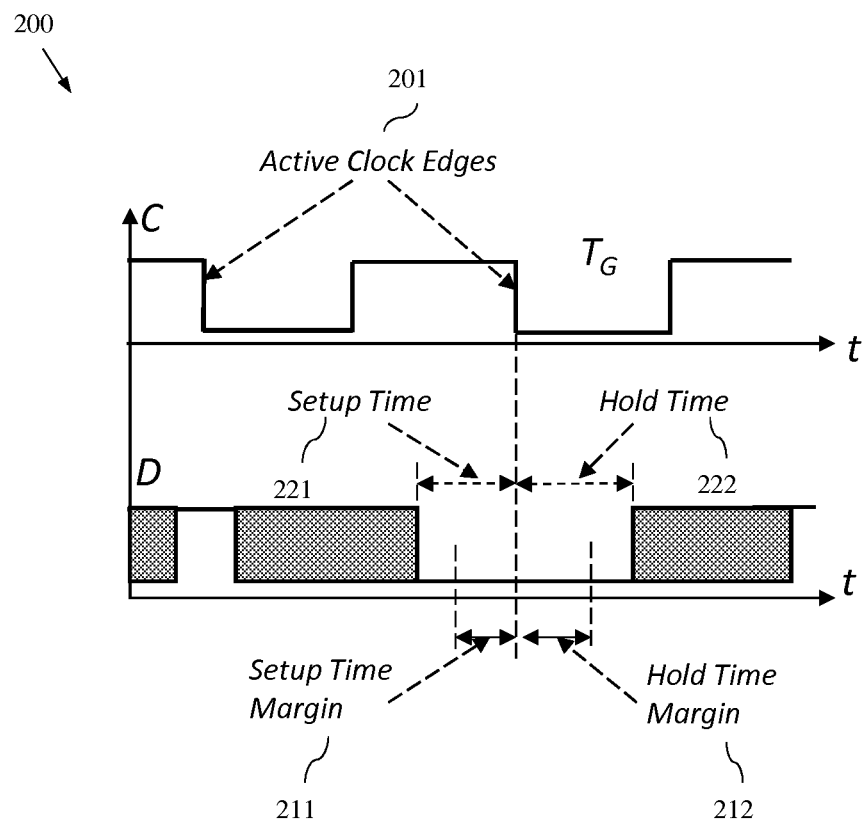
FIG. 2 is timing diagram illustrating the timing transitions associated with the integrated circuit of FIG. 1.

For example, consider an integrated circuit 100, as shown in FIG. 1, having a circuit block, for example, a latch, which requires the checking of setup and hold timing constraints. Specifically, for illustration purposes, this integrated circuit 100 may incorporate multiple data storage elements, such as data latches 110a-b (e.g., D-latches). Each D-latch 110 comprises a data signal input D, a clock signal input C, a data output signal Q and an inverse signal Q' of Q. As illustrated, the data output signal Q of one latch 110a can, for example, be processed by one or more logic blocks 130 (i.e., combinational logic circuit) and the result can be input as the data input signal D to the next latch 110b. The logic level of the data input signal D to latch 110b would be captured (i.e., stored in or held in the latch 110b), when an active edge (rising or falling, as applicable) of the clock signal input C arrives at that latch 110b. However, referring to the latch timing diagram 200 of FIG. 2, which shows the transitions (i.e., rising and falling edges) of the data signal input D and the clock signal input C over time t, the latch 110b will have both a setup time margin 211 and a hold time margin 212 for capturing the data input signal D. The setup time margin 211 is a specific period of time immediately prior to the arrival of an active edge (e.g., see falling active edge 201) of the clock signal input C during which the data signal input D must be stable for the latch 110b to function properly, whereas the hold time margin 212 is a specific period of time immediately after the arrival of that active edge during which the data signal input D must continue to remain stable for the latch 110b to function properly. In other words, for the latch 110b to function properly the actual setup time 221 must be greater than the setup time margin 211 and the actual hold time 222 must be greater than the hold time margin 212. To ensure that this happens, setup and hold time constraints (i.e., timing requirements) are established for each latch within a circuit.

During integrated circuit design, a statistical static timing analysis (SSTA) is typically performed at some selected pessimistic process corners to predict the setup time and hold time for each latch. Then, the results are compared to the established time constraints to determine if a violation will occur or not. Specifically, timing slack is computed and this timing slack is indicative of the degree to which a particular time constraint (i.e., a setup time constraint or a hold time constraint) is violated (i.e., negative slack) or not violated (i.e., positive slack). Thus, negative slack indicates how much the setup time or the hold time must be improved by design to avoid violating the particular time constraint, whereas positive slack indicates how much the setup time or hold time can be made worse by design (e.g., to save cost, power, etc.) without violating the particular time constraint.

Currently used techniques for establishing the time constraints (i.e., the timing requirements) for a circuit block, which requires the checking of setup and hold timing constraints, are conservative in order to ensure that the circuit block will function properly and, thereby, avoid circuit failure. However, because such techniques generally do not consider the interdependence between the setup time margin and the hold time margin of the circuit block and do not consider the impact of the range of possible variations in process, environmental or other parameters affecting circuit performance (i.e., do not involve parameterized SSTA), the techniques have to impose sufficient additional pessimism to ensure that, for all combinations of setup and hold time values and for all combinations of process and environmental parameters, the circuit block will function properly. Therefore, there is a need in the art for a technique that can be used to establish more optimistic time constraints (i.e., less pessimistic time constraints) for a circuit block, which requires checking of setup and hold timing constraints (e.g., latch, flip-flop, clock gating block, register, static memory, dynamic memory, etc.), by considering the interdependence between the setup time margin and the hold time margin of the circuit block as well as the impact on the circuit block of variations in process, environmental and other parameters affecting circuit performance.

Various techniques have been developed for establishing circuit block (e.g., latch, etc.) time constraints (i.e., setup time and hold time constraints). Some prior art techniques consider the interdependence between the setup time margin and hold time margin of a circuit block (e.g., see S. Srivastava, J, Roychowdhury, "Interdependent Latch Setup/Hold Time Characterization via Euler-Newton Curve Tracing on State-Transition Equations", DAC, 2007; E. Salman, A. Dasdan, F. Taraporevala, K. Küçükçakar, E. G. Friedman, "Exploiting Setup-Hold-Time Interdependence in Static Timing Analysis", TCAD, 2006; and E. Salman, A. Dasdan, F. Taraporevala, K. Küçükçakar, and E. Friedman, "Pessimism Reduction In Static Timing Analysis Using Interdependent Setup and Hold Times", IS QED, 2006). However, these techniques use a timing analysis at some selected process/environmental corner. They do not consider variations in process and/or environmental parameters (i.e., they do not use a parameterized SSTA) and, thereby, have limited accuracy. Another prior art technique considers the interdependence between the setup time margin and hold time margin of a circuit block (e.g., a latch) and also variations in process and/or environmental parameters (e.g., see S. Hatami, H. Abrishami, M. Pedram, "Statistical Timing Analysis of Flip-flops Considering Codependent Setup and Hold Times", *GLSVLSI*, 2008). However, this technique suffers from several problems. First, it assumes that delay of launching clock signal, delay of data combinational logic and delay of capturing clock signal are independent. This assumption is incorrect because these three delays may depend on the same process and/or environmental parameters. Second, it assumes that actual setup and hold times and the setup time and hold time margins are independent. This assumption is also incorrect because the actual setup and hold times and the setup time and hold time margins may depend on the same process and/or environmental parameters. Finally, the overall computational procedure used in this technique is very complicated and inefficient. Specifically, this technique requires a computation of joint probability density functions, complex two-dimensional partitioning of the setup/hold plane into many regions, finding intersections of setup/hold curves with multiple regions, and a separate computation of probability for each intersection. Furthermore, it computes only probabilities of setup/hold failures and not parameterized timing slack, which is required for guiding circuit optimization procedures and timing sign-off procedure. Thus, the probabilities, which are computed under too simplistic assumptions, are incorrect.

In view of the foregoing, disclosed herein are embodiments of a method for performing a parameterized statistical static timing analysis (SSTA) of an integrated circuit taking into account setup and hold margin interdependence as well as embodiments of an associated system and a program storage device. In these embodiments, more optimistic and more accurate (i.e., less pessimistic) time constraints for a circuit block, which requires checking of setup and hold timing constraints (e.g., a latch, flip-flop, clock gating block, register, static memory, dynamic memory, etc.), are established based on the interdependence between the setup time margin and hold time margin. Specifically, the interdependence between the setup and hold time margins of a circuit block can be determined (e.g., characterized, measured, modeled, etc.) in parameterized statistical form so as to take into account possible variations in multiple parameters (e.g., multiple process, environmental and other parameters affecting circuit performance). A parameterized statistical static timing analysis (SSTA) of a circuit incorporating the circuit block can be performed in order to determine, in parameterized statistical form, setup and hold times for the circuit block. Furthermore, based on the interdependence between the setup and hold time margins, setup and hold time constraints can be determined for the circuit block within the circuit. The setup and hold time constraints can also be in parameterized statistical form. The setup and hold times determined during the SSTA can be checked against the setup and hold time constraints to determine, for example, if the time constraints are violated or not and to what degree. Finally, timing yield computation, circuit optimization, etc. can be performed. One technique for checking the setup and hold times against the setup and hold time constraints is to compute a combined setup and hold timing slack in statistical parameterized form, taking into account both the dependence of setup and hold times on process and environmental variations and the interdependence of setup and hold time margins. This combined statistical parameterized setup and hold timing slack can also be used for various other purposes (e.g., to determine timing yield, to perform circuit optimization, etc.).

Figure 3:
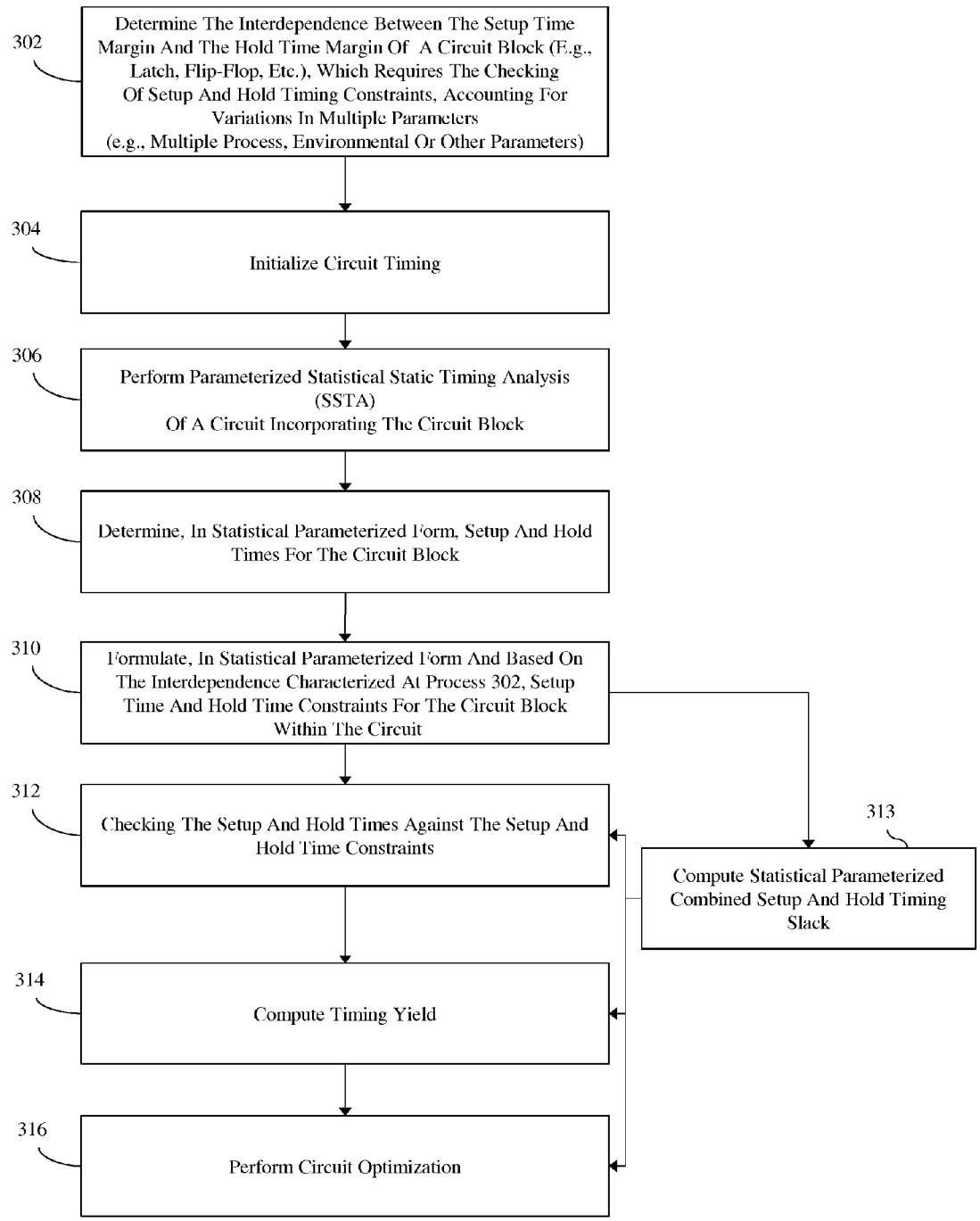
FIG. 3 is a flow diagram illustrating embodiments of a method for performing a parameterized statistical statistic timing analysis (SSTA)

Specifically, referring to the flow diagram of FIG. 3, disclosed herein are embodiments of a computer-implemented method for performing a parameterized statistical static timing analysis (SSTA) of an integrated circuit taking into account setup and hold margin interdependence.

The method can comprise determining the interdependence between the setup time margin and the hold time margin of a circuit block, which requires checking of setup and hold timing constraints (e.g., latch, flip-flop, clock gating block, register, static memory, dynamic memory, etc.) (302). In a preferred embodiment, the interdependence between the setup time and hold time margins can be determined using a variation-aware characterization process, as discussed in greater detail below. Alternatively, the interdependence between the setup time and hold time margins can be determined using other techniques, for example, by measuring manufactured chips, by running analytical models, by receiving such information from a circuit designer, etc. In any case, instead of performing this process 302 at a single process corner (e.g., at some selected pessimistic process corner), the process 302 can be performed specifically so as to account for statistical variations in multiple parameters. These multiple parameters can comprise, for example, process parameters (also referred to herein as manufacturing parameters), environmental parameters or other parameters affecting circuit performance.

For purposes of this disclosure, the term "process parameter" refers to a parameter, such a physical dimension or an electrical parameter of a component of the integrated circuit (such as a transistor or an interconnect wire), that may vary due to variations in manufacturing processes and that may impact circuit performance. For example, process parameters can include, but are not limited to, channel length, threshold voltage, saturation current, wire width, wire resistance, capacitance, etc. Furthermore, for purposes of this disclosure, the term "environmental parameter" refers to a parameter, such as temperature or power supply voltage, at which the integrated circuit will operate and that may impact integrated circuit performance. For example, environmental parameters are parameters that are not specific to the circuit block, but rather also affect the logic gates, interconnects, etc. which in turn affect integrated circuit performance. For purposes of this disclosure, other parameters that affect circuit performance, include but are not limited to, circuit age, radiation, coupling noise, electromagnetic interference, etc.

More particularly, as discussed above, prior art techniques are known which establish time constraints for a circuit block, such as a latch, by characterizing the interdependence between the setup time margin and hold time margin in the form of piece-wise linear function. However, rather than accounting for variations in process, environmental or other parameters, such techniques characterize this interdependence at some selected process and/or environmental corner. Specifically, referring to the Setup Time $T_S$/Hold Time $T_H$ graph of FIG. 4, the values of multiple process and environmental parameters are set to predetermined values associated with a single process and environmental corner. Then, the setup time $T_S$ is set to a predetermined large value and the hold time is characterized at infinity $T_{H,Inf}$ by simulating behavior with circuit simulation tool. This large value of setup time can be selected to be larger than any possible setup time in any circuit to be analyzed. For example, the large value of setup time can be selected as maximum possible clock cycle. It should, however, be understood that alternative ways for selecting the sufficiently large value of setup time could be used. For example, another criterion for selection of large setup time is to find the setup time so large that further increase of setup time does not decrease the corresponding hold time.

Next, the hold time $T_S$ is set to a predetermined large value and the setup time is similarly characterized at infinity $T_{S,Inf}$. Similarly, the large value of hold time can be selected as maximum possible clock cycle. Another criterion for selection of large hold time is to find the hold time so large that further increase of hold time does not decrease the corresponding setup time.

A setup constraint $T_{S,1}$ can then be computed by applying some margin to $T_{S,Inf}$ and the corresponding hold constraint $T_{H,1}$ can be characterized. In practice, a 10% margin can result in a sufficiently good approximation of setup and hold time interdependence with piece-wise linear function. However, depending on the actual curve 401 of setup and hold time interdependence, a different margin can provide better results. Therefore, if the characterization with 10% margin does not provide sufficiently accurate approximation, the margin can be adjusted to improve the approximation and the characterization is repeated with the adjusted margin. If necessary, the iterative process of margin adjustment can be repeated until a sufficiently accurate approximation is achieved. Similarly, a hold time constraint $T_{H,2}$ can be computed by applying some margin to $T_{H,Inf}$ and the corresponding setup constraint $T_{S,2}$ can be characterized. The margin for hold time characterization can be selected similarly to selection of the setup characterization margin. Finally, the interdependence between the setup time margin and the hold time margin can be characterized at this given process corner as a piece-wise linear function (see exemplary 3-piece or 3-segment linear function 402), by computing values of $T_{H,0}$ and k describing the angled part of the piece-wise linear function and corresponding to the computed values of $T_{S,1}$, $T_{H,1}$, $T_{S,2}$, and $T_{H,2}$, where $$T_H = T_{H,0} - kT_S \quad (1)$$

is a linear function describing the angled part of the piece-wise linear function. The slope k and constant term $T_{H,0}$ of this linear function are computed from the characterized values of $T_{S,1}$, $T_{H,1}$, $T_{S,2}$, and $T_{H,2}$ by the following formulas:

$$k = (T_{H,2} - T_{H,1})/(T_{S,1} - T_2); \text{ and} \quad (2)$$

$$T_{H,0} = T_{H,1} + kT_{S,1} \quad (3)$$

That is, in this exemplary piece-wise linear function 402, for any hold time greater than $T_{H,1}$, the setup time will remain essentially constant at $T_{S,1}$. Additionally, for any setup time greater than $T_{S,2}$, the hold time will remain essentially constant at $T_{H,2}$, which is less than $T_{H,1}$. Finally, the hold time will increase linearly from $T_{H,2}$ to $T_{H,1}$ with a slope of k, as the setup time decreases from $T_{S,2}$ to $T_{S,1}$. For illustration purposes, this exemplary piece-wise linear function is shown in FIG. 4 with three line segments or sections: one vertical, one angled and one horizontal.

The present invention goes beyond determining the interdependence between the setup time margin and the hold time margin of a circuit block (e.g., a latch, flip-flop, etc.) at a single process corner to accounting for variations in multiple process parameters, environmental parameters and/or other parameters affecting circuit performance (302). As mentioned above, one technique for determining the interdependence between the setup time margin and hold time margin can comprise a variation-aware characterization process. This variation aware-characterization process can be performed, for example, as shown in the flow diagram of FIG. 5.

Figure 4:
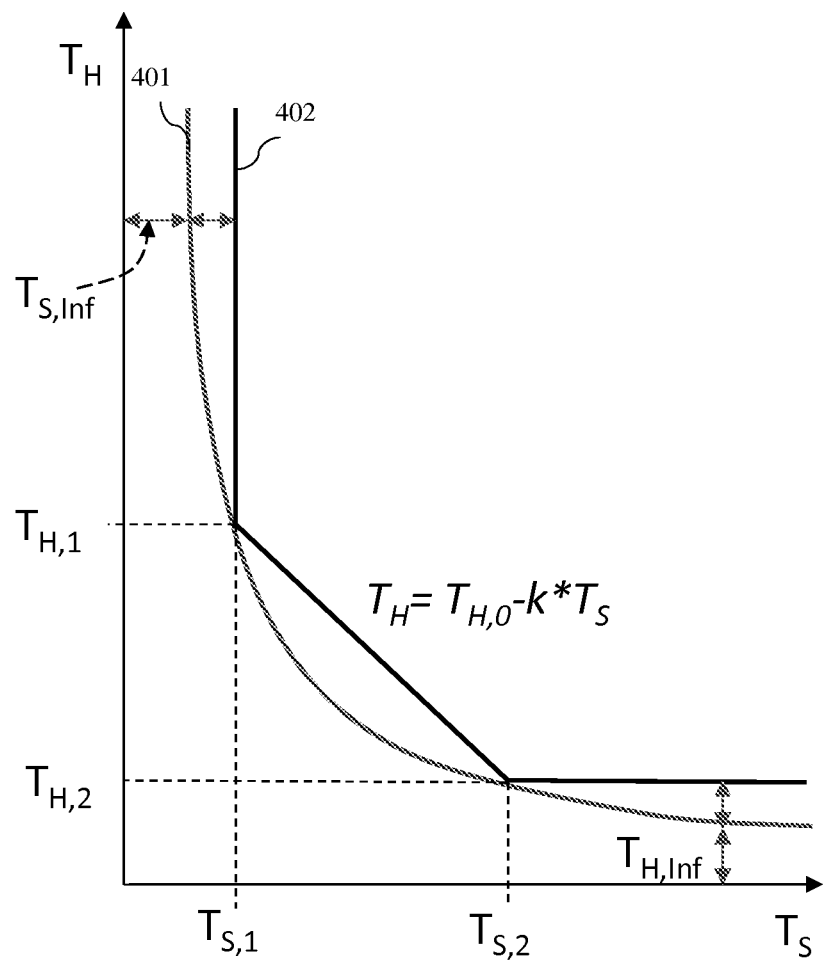
FIG. 4 is graph illustrating setup time to hold time interdependence, as characterized at process step 302 of FIG. 3.
Figure 5:
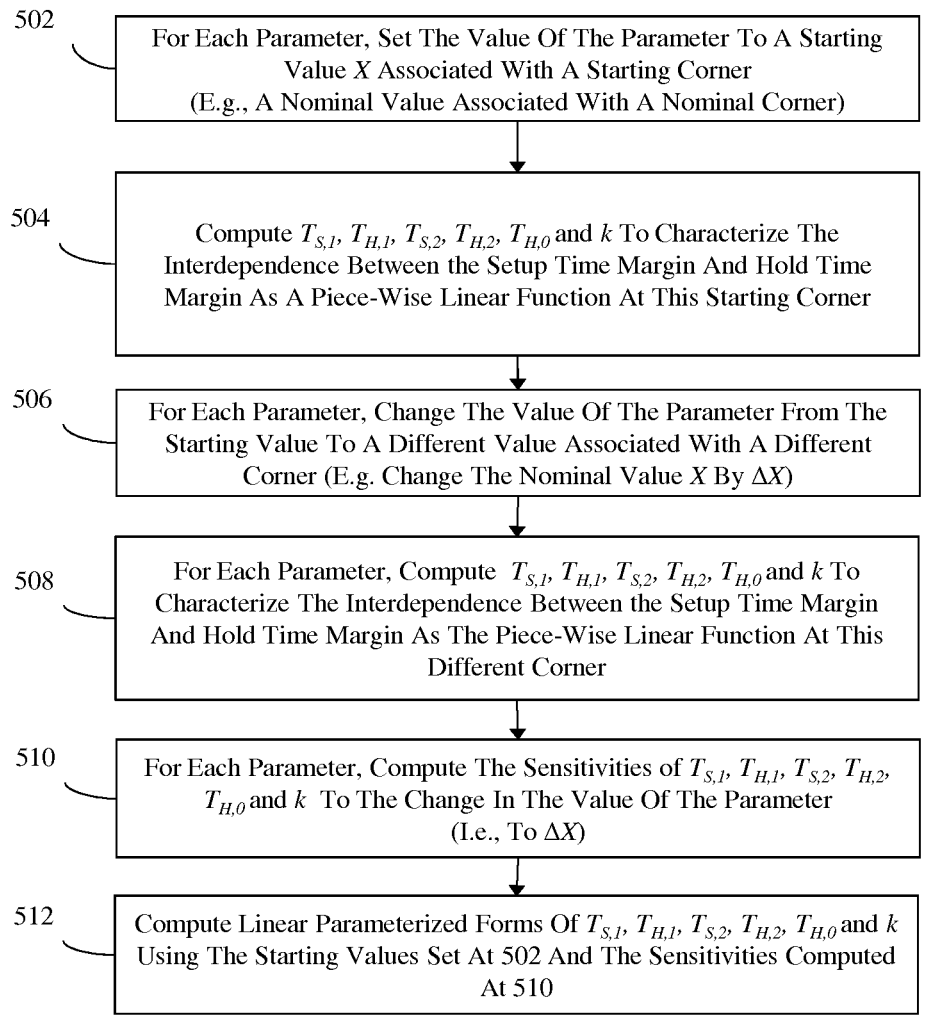
FIG. 5 is a flow diagram illustrating an exemplary technique for performing process step 302 of FIG. 3.

Specifically, referring to the flow diagram of FIG. 5 in combination with the Setup Time $T_S$/Hold Time $T_H$ graph of FIG. 4, in order to characterize the interdependence between the setup time margin and the hold time margin of a circuit block, which requires checking of setup and hold timing constraints (e.g., a latch, flip-flop, clock gating block, register, static memory, dynamic memory, etc.), multiple parameters, including process parameters, environmental parameters and/or other parameters affecting circuit performance, can be set at selected starting values (502). The selected starting values can, for example, be nominal values associated with a nominal (i.e., typical) process and/or environmental corner. That is, the value of each parameter can first be set at a selected starting value X and this starting value X can be a nominal value associated with a nominal (i.e., typical) process and/or environmental corner. Alternatively, the selected starting value X can be associated with another process and/or environmental corner different from the nominal one. For example, in one embodiment, the selected starting values can be associated with the worst process and/or environmental corner, (i.e. the process and/or environment corner corresponding to the worst possible circuit performance). In another embodiment, the selected starting values can be associated with best process and/or environmental corner (i.e. the process and/or environment corner corresponding to the best possible circuit performance).

For illustration purposes, however, the characterization process is described below assuming that the selected starting values are nominal values associated with a nominal corner. In this case, $T_{S,1}$, $T_{H,1}$, $T_{S,2}$, $T_{H,2}$, $T_{H,0}$ and k can be computed, in the same manner as described above, in order to characterize the interdependence between the setup time margin and hold time margin as a piece-wise linear function at the starting process and/or environmental corner (504).

Next, for each parameter, the value of the parameter can be changed from the corresponding starting value X to a different value associated with a different process and/or environmental corner (506). That is, the starting value X of the parameter can be changed by some amount ($\Delta X$), where $\Delta X$ is defined as the difference between two different values for the parameter ($X-X'$) at two different process and/or environmental corners. For example, the two different values for the parameter can correspond to the nominal value and an extreme value for the parameter at which the integrated circuit is required to function correctly. Then, $T_{S,1}$, $T_{H,1}$, $T_{S,2}$, $T_{H,2}$ and $T_{H,0}$ and k can be computed, in the same manner as described above, in order to characterize the interdependence between the setup time margin and hold time margin as the piece-wise linear function at the different process and/or environmental corners (508).

Such a piece-wise linear function, like the exemplary piece-wise linear function 402 shown in FIG. 4 and described in detail above, can comprise a vertical line segment indicating that the setup time margin will remain essentially constant at $T_{S,1}$ when the hold time margin is greater than a given hold time $T_{H,1}$; a horizontal line segment indicating that the hold time margin will remain essentially constant at $T_{H,2}$ when the setup time margin is greater than a given setup time $T_{S,2}$; and an angled line segment connected at one end to the vertical line segment, connected at an opposite end to the horizontal line segment and indicating a decrease in the hold time margin as a function of an increase in the setup time margin between a minimum setup time of $T_{S,1}$ and the higher setup time of $T_{S,2}$. However, those skilled in the art will recognize that, alternatively, a piece-wise linear function with any of the following could be formulated: (1) with more than one angled line segments; (2) with no angled line segments (e.g., with only horizontal and/or vertical line segments); or (3) without horizontal and/or vertical line segments (i.e., with only angled line segment(s)). It should be understood that a piece-wise linear function with multiple angled line segments can provide higher accuracy of approximation at the expense of higher computation complexity of both pre-characterization and statistical timing analysis of interdependent setup and hold timing constraints. It should further be understood that the characterization of setup and hold time interdependence for a selected process corner can be performed by well-known techniques, such as the alternative techniques described in the literature referenced above.

Then, for each parameter, the sensitivities of variables in the piece-wise linear function to changes in the value of the parameter at process 506 are determined (510). That is, as discussed above, the variables in the piece-wise linear function can be $T_{S,1}$, $T_{H,1}$, $T_{S,2}$, $T_{H,2}$, $T_{H,0}$, and k and the sensitivities of these variables to changing the value of the parameter from the starting value X to the different value (i.e., to $\Delta X$) can be computed. For the purpose of this disclosure the term "sensitivity" refers to the degree of susceptibility of change in particular variable given a change in the variable (i.e., given $\Delta X$). The sensitivity of each variable to $\Delta X$ can, for example, be computed at process 510 using the following finite-differencing formula:

$$S_{Z,X} = \frac{Z(X+\Delta X) - Z(X)}{\Delta X}, \tag{4}$$

where $S_{Z,X}$ is the sensitivity of a select one of the variables: $T_{S,1}, T_{H,1}, T_{S,2}, T_{H,2}, T_{H,0}$, and k. Alternatively, the sensitivity of each variable to $\Delta X$ can be computed using a least squares fitting or linear regression of the results of a Monte-Carlo simulation.

Once the sensitivities are computed at process 510, linear parameterized forms of the variables (i.e., of $T_{S,1}$, $T_{H,1}$, $T_{S,2}$, $T_{H,2}$, $T_{H,0}$, and k) can be computed using the starting values for the parameters set at process 502 and further using the sensitivities computed at process 510, thereby characterizing the interdependence between the setup time margin and the hold time margin of the circuit block in a manner that accounts for variations in multiple process and/or environmental parameters (512). The linear parameterized form (i.e. canonical form) is defined by the following formula:

$$Z = z_0 + \sum_{i=1}^{n} s_{Z,i} \Delta X_i + s_{Z,R} \Delta R, \tag{5}$$

where Z is the quantity represented in linear parameterized form (for example, one of $T_{S,1}$, $T_{H,1}$, $T_{S,2}$, $T_{H,2}$, $T_{H,0}$, and k), $z_0$ is the mean value of Z, $\Delta X_i$ refers to global random sources of variations typically having a Gaussian distribution with zero mean and unity standard deviation, $s_{Z,i}$ refers to sensitivity of Z to global random sources of variations, $\Delta X_R$ refers to independent random variations typically having Gaussian distribution with zero mean and unity standard deviation, $a_{Z,R}$ refers to sensitivity to independent variation.

While the variations mentioned above (e.g., the global random sources of variations and the independent random variations) will typically have a Gaussian distribution, it should be understood that the method also alternatively applies to such variations with non-Gaussian distributions. The simplest approach to solving this formula (5) assumes $z_0$ to be a value of Z at nominal process and/or environmental corner and sensitivities $s_{Z,i}$ are computed according to the above formula (4). The sensitivity to independent random variation can be computed similarly to computing the sensitivities to global variations. Alternatively, sensitivity to independent random variation can be computed by modeling errors as non-linear function from which a linear function is approximated. Those skilled in the art will recognize that there are various alternative techniques that can be used to compute the mean value and sensitivities of the linear parameterized form. For example, the mean value and sensitivities can be computed by matching values of the linear form and values of the quantity to be represented in the linear form at the required process and/or environmental corners, by using a linear regression technique, or by using a least squares fitting technique.

Again, it should be noted that the above-described variation-aware characterization process is only one of many possible ways of determining interdependence between the setup time margin and hold time margin in parameterized form. Alternatively, this interdependence can be determined by taking direct measurements of the characteristics of the circuit block from manufactured chips. This interdependence can also be determined from analytical models of the circuit block. This interdependence can be also simply be asserted by and received from a circuit designer on the basis of his/her experience accumulated from previously designed circuits.

Referring again to FIG. 3, once the interdependence between the setup time margin and the hold time margin of the circuit block (e.g., latch, flip-flop, etc.) is characterized at process 302, statistical timing of a circuit and, particularly, statistical timing of an integrated circuit chip that will incorporate this circuit block can be initialized (304). This circuit timing initialization process 304 can, for example, comprise reading a circuit description in the form of a netlist, setting asserted values of signal arrival and required times, reading libraries of standard logic cells, setting set of process and/or environmental variables and process and/or environmental corners, etc. Techniques for circuit timing initialization are well known in the art and, thus, the details are omitted from this specification in order to allow the reader to focus on the salient aspects of the disclosed embodiments.

After circuit timing is initialized at process 304, a parameterized statistical static timing analysis (SSTA) of the circuit can be performed to determine (i.e., predict) an actual setup time and an actual hold time for the circuit block, in statistical parameterized form (306-308) for all required process and/or environmental variables corresponding to multiple process and/or environmental corners. Specifically, such a parameterized SSTA process can be performed in order to model the arrival times of signals (e.g., data input signals and clock signals) in linear statistical parameterized forms (i.e. canonical forms) using, for example, the following formula:

$$T = t_0 + \sum_{i=1}^{n} \alpha_i \Delta X_i + \alpha_R \Delta X_R \qquad (6)$$

, where $t_0$ is the mean time, $\Delta X_i$ refers to global random sources of variations typically having Gaussian distribution with zero mean and unity standard deviation, $a_i$ refers to sensitivity to global random sources of variations, $\Delta X_R$ refers to independent random variation also typically having Gaussian distribution with zero mean and unity standard deviation, $a_R$ refers to sensitivity to independent variation. While the variations mentioned above (e.g., the global random sources of variations and the independent random variations) will typically have a Gaussian distribution, it should be understood that the method also alternatively applies to such variations with non-Gaussian distributions. Based on the parameterized SSTA, the setup time $T_S$ and hold time $T_H$ can, for example, be computed in linear statistical parameterized forms (i.e. canonical forms) as follows:

$$T_S = AT_{CE} - AT_{DL}; \text{ and} \qquad (7)$$

$$T_H = AT_{DE} - AT_{CL}, \qquad (8)$$

where AT refers to the arrival time of the active edge, CE refers to "clock early" or the worst case clock signal input arrival time for setup; DL refers to "data late" for the worst case data signal input arrival time for data setup, DE refers to "data early" or the worst case data signal input arrival time for hold and CL refers to "clock late" or the worst case clock signal arrival time for hold. In the formulas described above, all arrival times are computed by SSTA in linear parameterized statistical form. However, those skilled in the art will recognize that, alternatively, different formulas could be used during SSTA so as to compute such arrival times in non-linear parameterized form. Techniques for performing parameterized SSTA and computing circuit block setup and hold times are well known in the art and, thus, the details are omitted from this specification in order to allow the reader to focus on the salient aspects of the disclosed embodiments.

Figure 6:
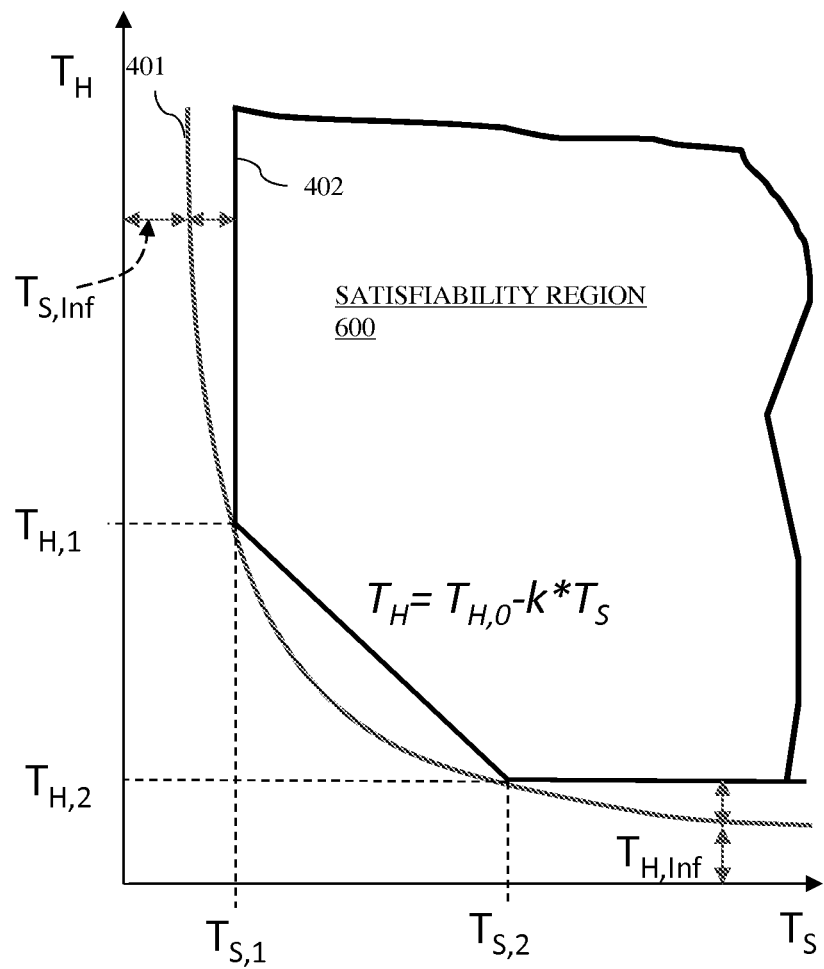
FIG. 6 is a graph illustrating setup time to hold time interdependence and a satisfiability region as defined at process step 310 of FIG. 3.

Furthermore, based on the interdependence between setup time margin and hold time margin of the circuit block, a setup time constraint and a hold time constraint for the circuit block within the circuit can be formulated in statistical parameterized form (310). Specifically, FIG. 6 illustrates a satisfiablity region 600 that can be defined using the exemplary three-section piece-wise linear function of FIG. 4. This satisfiability region 600 is that region where setup time and hold time constraints for the circuit block are satisfied. This satisfiabiltiy region 600 can be defined, for example, by formulating a set of inequalities between the variables (i.e., $T_{S,1}$, $T_{H,1}$, $T_{S,2}$, $T_{H,2}$, $T_{H,0}$, and k) of the piece-wise linear function. For example, the set of inequalities can include the following: $T_S > T_{S,1} \Rightarrow T_S - T_{S,1} > 0$ (i.e., the relaxed setup slack); $T_H > T_{H,2} \Rightarrow T_H - T_{H,2} > 0$ (i.e., relaxed hold slack); and $T_H > T_{H,0} - k^* T_S \Rightarrow T_H - T_{H,0} - k^* T_S > 0$ (setup/hold slack corresponding to the angled part of piece-wise linear approximation of setup and hold time interdependence curve). This set of inequalities can further be expressed in the form of a single inequality as follows:

$$\text{MIN}(T_S - T_{S,1}, T_H - T_{H,2}, T_H - T_{H,0} - k^* T_S) > 0, \qquad (9)$$

where $T_S$ and $T_H$ are the actual setup and hold times determined at process 308 as linear statistical parameterized forms (i.e., as canonical forms), where $T_{S,1}$ $T_{H,2}$, and $T_{H,0}$ are the variables of the piece-wise linear function which actually define the satisfiability region 600 and which are computed by the characterization process 302 as linear statistical parameterized forms (i.e. statistical canonical forms), where MIN is the statistical minimum function used during SSTA, and where the product of linear forms $k^* T_S$ is a quadratic form of sources of variations. In this case, quadratic terms can be approximated conservatively in the region of variations with either constant or linear terms. Alternatively, quadratic terms can be used in calculations directly by applying the statistical minimum function for non-linear functions.

The setup time and hold time determined during the SSTA at process 306 can then be checked against the setup time constraint and the hold time constraint determined at process 310 to determine, for example, if the setup time constraint and hold time constraint are violated or not and to what degree (312). Once the setup and hold time are checked against the corresponding constraints at process 310, timing yield can be determined and other processes, such a circuit design optimization, can be performed (314-316). That is, the probability that the setup and hold timing constraints will be satisfied can be determined (314). In other words, timing yield refers to the probability that chips manufactured according to the design will meet the timing requirements. Then, design changes can be made, if necessary, to enhance the probability that the setup and hold timing constraints will be satisfied (316).

One technique for checking the setup time and hold time against the corresponding constraints is to compute a combined statistical parameterized setup and hold timing slack for the setup time constraint and the hold time constraint (313). Specifically, the expression MIN($T_S - T_{S,1}$, $T_H - T_{H,2}$, $T_H - T_{H,0} - k^* T_S$)>0, discussed above, should be satisfied for the circuit block to function properly. Thus, to check the actual setup and hold times against the setup and hold time constraints, a combined statistical setup and hold slack for the setup time constraint and the hold time constraint can be computed in statistical parameterized form and used as opposed to separate setup and hold slacks. That is, a combined statistical setup and hold slack can be used to determine if the constraints are violated or not violated and also the degree to which they are either violated or not violated. In this case, $S_{SH} = \text{MIN}(T_S - T_{S,1}, T_H - T_{H,2}, T_H - T_{H,0} - k^* T_S)$ can be considered the combined setup and hold timing slack in statistical parameterized form. A negative combined slack $S_{SH}$ will indicate a non-functioning circuit block and also how much the setup time and/or the hold time must be improved, by design, to create a functioning circuit block. Contrarily, a positive combined slack $S_{SH}$ will indicate a functioning circuit block and also how much the setup time and/or hold time can be made worse, by design (e.g., to save cost, power, etc.), without resulting in a non-functioning circuit block. It should be noted that since, as discussed above, $T_S = AT_{CE} - AT_{DL}$, $T_H = AT_{DE} - AT_{CL}$, $T_{S,1}$ $T_{H,2}$, and $T_{H,0}$ are in linear statistical parameterized forms (i.e. statistical canonical forms), and $k*T_S$ is a quadratic form of sources of variations approximated as linear form, $S_{SH}$ will also be in linear parameterized form (i.e., canonical form) computed by statistical MIN function and, thereby dependent on variations in process and/or environmental parameters.

The combined statistical parameterized setup and hold timing slack for the setup time constraint and the hold time constraint determined at process 313 can also be used for various other purposes. For example, once computed, the combined statistical parameterized setup and hold timing slack $S_{SH}$ can be used to determine timing yield at process 314. Specifically, this computation can be performed using known probability distributions of the process and/or environmental variations and the combined statistical setup and hold timing slack expressed in linear statistical parameterized form. This computation can be especially simple if the process and/or environmental variations are independent, centralized, and normalized, Gaussian random variables with zero mean values and unity standard deviation, which is the most common case in the practice of SSTA. Then, a linear canonical form of these random variables will have a Gaussian distribution as well with the mean given by its mean coefficient and the standard deviation computed as squared root or the sum of its squared sensitivities. Based on the probability distribution of the combined statistical setup and hold timing slack, the timing yield can be computed as the probability that this slack has positive value. However, it should be noted that a similar computation can be performed for sources of variations having more complex probability distributions, like correlated and non-correlated general Gaussian and non-Gaussian distributions. A similar computation can be also performed for a combined statistical setup and hold timing slack expressed in non-linear parameterized form that can be obtained if the SSTA operates with nonlinear expressions of signal delays, arrival and required arrival times. In this case, well-known mathematical techniques for computing the probability distribution of a multivariate function of several random variables with known probability distributions can be used.

The combined statistical setup and hold timing slack, particularly when expressed in linear parameterized form, can be used for subsequent circuit analysis, design and optimization (316). For example, this linear parameterized form of the combined statistical setup and hold timing slack provides information on the sensitivity of the timing slack to process and environmental variations. It also shows at what combination of process and environmental parameters the circuit fails to operate correctly. Thus, it can be used for guiding circuit optimization (i.e., for guiding design changes to enhance the timing yield) as it provides a convenient single metric of circuit performance. Guiding circuit optimization by the combined setup and hold time timing slack in parameterized form can produce better optimization results because it takes into account that setup and hold time can be correlated both due to their interdependence and due to their dependence on same process and environmental parameters.

Figure 7:
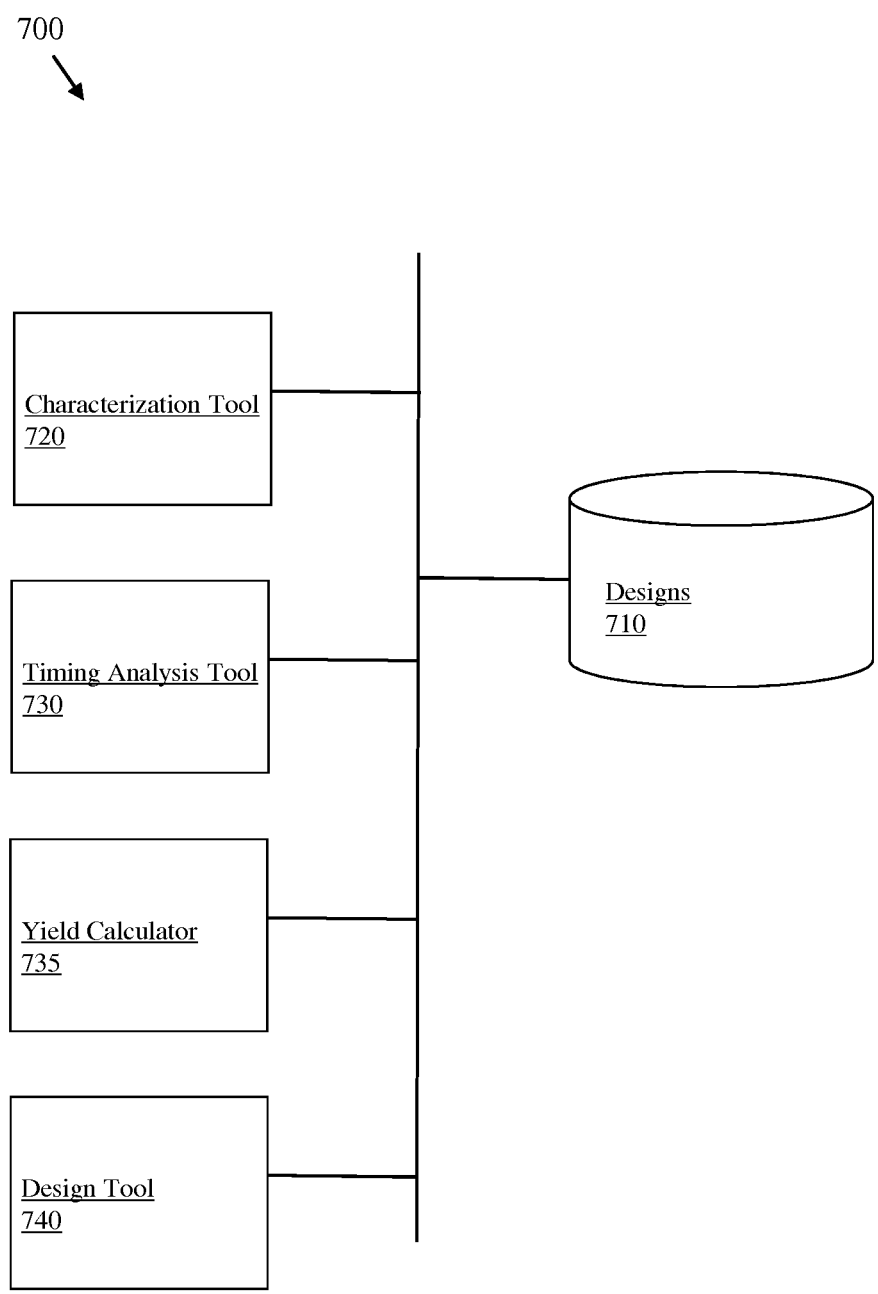
FIG. 7 is a schematic diagram illustrating embodiments of a system for performing a parameterized statistical statistic timing analysis (SSTA)

Also disclosed herein are embodiments of a computer system 700 for statistical static timing analysis (SSTA), as shown in FIG. 7. The system 700 can be implemented, for example, in a computer hardware environment such as that described in detail below and depicted in FIG. 8. Specifically, referring to FIG. 7, the system 700 embodiments can comprise one or more memory devices. The memory device(s) can store (i.e., can be adapted to store, configured to store, etc.) design data 710. For example, the memory device(s) can store a design of a circuit block, which requires checking of setup and hold timing constraints (e.g., a latch, flip-flop, clock gating block, register, static memory, dynamic memory, etc.), as well as a design of a circuit incorporating the circuit block. In one embodiment, the design of the circuit block can be in the form of a cell maintained in a library of cells, each representing a design (e.g., a netlist, a layout, etc.) for low-level logic functions such as gates, flip-flops, latches, etc. and the design of the circuit can comprise a plurality of standard cells selected from the library, customized cells, etc.

The system 700 embodiments can further comprise one or more computer processing units (i.e., processors) in communication with the memory device(s). Specifically, the processor(s) can comprise an optional characterization tool 720, a timing analysis tool 730, a yield calculator 735 and a design tool 740 in communication with the memory device(s). It should be noted that the characterization tool 720, timing analysis tool 730, yield calculator 735, and design tool 740 can each be implemented by discrete units (e.g., discrete computer systems or discrete computer processing units (i.e., discrete processors)). Alternatively, any two or more of the components 720, 730, 735 and 740 can be implemented by a single unit (e.g., by a single computer system or by a single computer processing unit (i.e., a single processor)).

The characterization tool 720 can characterize (i.e., can be adapted to characterize, configured to characterize, programmed to characterize, etc.) the interdependence between a setup time margin and a hold time margin of the circuit block taking into consideration variations in multiple parameters. These multiple parameters can comprise, for example, process parameters (also referred to herein as manufacturing parameters), environmental parameters and/or other parameters affecting circuit performance.

As discussed in detail above with regard to process 302 of the method embodiment of FIG. 3, this variation-aware characterization can be accomplished by performing the following for each parameter. The characterization tool 720 can set (i.e., can be adapted to set, configured to set, programmed to set, etc.) a value of the parameter to a starting value that often is convenient to associate with a nominal process and/or environmental corner. That is, the value of each parameter can be set by the characterization tool 720 at a starting value X that can be associated with a nominal (i.e., typical) process and/or environmental corner. Then, the characterization tool 720 can compute, for each parameter, $T_{S,1}$, $T_{H,1}$, $T_{S,2}$, $T_{H,2}$, $T_{H,0}$ and k in order to characterize the interdependence between the setup time margin and hold time margin as a piece-wise linear function at the starting process and/or environmental corner.

Next, the characterization tool 720 can change (i.e., can be adapted to change, configured to change, programmed to change, etc.) the value of the parameter from the corresponding starting value X to a different value associated with a different process and/or environmental corner. That is, the starting value X of the parameter can be changed by some amount ($\Delta X$), where $\Delta X$ is defined as the difference between two different values for the parameter (X-X') at two different process and/or environmental corners. For example, the two different values for the parameter can correspond to the nominal value and an extreme value for the parameter at which the integrated circuit is required to function correctly. Then, the characterization tool 720 can compute, for each parameter variation, $T_{S,1}$, $T_{H,1}$, $T_{S,2}$, $T_{H,2}$ and $T_{H,0}$ and k in order to characterize the interdependence between the setup time margin and hold time margin as the piece-wise linear function at the different process and/or environmental corner.

Such a piece-wise linear function, like the exemplary piece-wise linear function shown in FIG. 4 and described in detail above, can comprise a vertical line segment indicating that the setup time margin will remain essentially constant at $T_{S,1}$ when the hold time margin is greater than a given hold time $T_{H,1}$; a horizontal line segment indicating that the hold time margin will remain essentially constant at $T_{H,2}$ when the setup time margin is greater than a given setup time $T_{S,2}$; and an angled line segment connected at one end to the vertical line segment, connected at an opposite end to the horizontal line segment and indicating a decrease in the hold time margin as a function of an increase in the setup time margin between a minimum setup time of $T_{S,1}$ and the higher setup time of $T_{S,2}$. However, those skilled in the art will recognize that, alternatively, a piece-wise linear function with any of the following could be formulated: (1) with more than one angled line segments; (2) with no angled line segments (e.g., with only horizontal and/or vertical line segments); or (3) without horizontal and/or vertical line segments (i.e., with only angled line segment(s)). It should be understood that a piece-wise linear function with multiple angled line segments can provide higher accuracy of approximation at the expense of higher computation complexity of both pre-characterization and statistical timing analysis of interdependent setup and hold timing constraints. It should further be understood that the characterization of setup and hold time interdependence for a selected process corner can be performed by well-known techniques, such as the alternative techniques described in the literature referenced above.

Then, for each parameter, the characterization tool 720 can determine (i.e., can be adapted to determine, configured to determine, programmed to determine, etc.) the sensitivities of variables in the piece-wise linear function to the changes in the value of the parameter. That is, as discussed above, the variables in the piece-wise linear function can be $T_{S,1}$, $T_{H,1}$, $T_{S,2}$, $T_{H,2}$, $T_{H,0}$ and k and the sensitivities of these variables to changing the value of the parameter from the starting value to the different value (i.e., to $\Delta X$) can be computed (see detailed discussion above regarding formula (4) and process step 510 above). Once the sensitivities are computed, linear parameterized forms of the variables (i.e., of $T_{S,1}$, $T_{H,1}$, $T_{S,2}$, $T_{H,2}$, $T_{H,0}$ and k) can be computed by the characterization tool 720 using the previously set starting values for the parameters and further using the previously computed sensitivities, thereby characterizing the interdependence between the setup time margin and the hold time margin of the circuit block in a manner that accounts for variations in multiple process and/or environmental parameters.

It should be noted that the above-described characterization tool configured to perform variation-aware characterization process is only one of many possible tools and/or techniques capable of determining the interdependence between the setup time margin and hold time margin in parameterized form. Alternatively, the processor(s) can determined this interdependence based on information received from tools that take direct measurements of the characteristics of the circuit block from previously manufactured chips, for tools that generate analytical models of the circuit block and/or directly from a circuit designer, based of his/her experience accumulated from previously designed circuits.

The statistical timing analysis tool 730 can then initialize (i.e., can be adapted to initialize, configured to initialize, programmed to initialize, etc.) statistical timing of a circuit and, particularly, statistical timing of an integrated circuit chip that will incorporate the circuit block, which was previously determined (e.g., characterized by the characterization tool 720). Specifically, the circuit timing initialization process performed by the statistical timing analysis tool 730 can comprise reading a circuit description in the form of a netlist, setting asserted values of signal arrival and required times, reading libraries of standard logic cells, setting set of process and/or environmental variables and process and/or environmental corners, etc. Techniques for circuit timing initialization are well known in the art and, thus, the details are omitted from this specification in order to allow the reader to focus on the salient aspects of the disclosed embodiments.

The statistical timing analysis tool 730 can further perform (i.e., can be adapted to perform, configured to perform, programmed to perform, etc.) a parameterized statistical static timing analysis (SSTA) of the circuit at multiple process and/or environmental corners to determine (i.e., predict) an actual setup time and an actual hold time for the circuit block, in statistical parameterized form. As discussed in detail above with regard to processes 306 and 308 of the method embodiment of FIG. 3, the parameterized SSTA can be performed in order to model the arrival times of signals (e.g., data input signals and clock signals) in linear parameterized forms (i.e. canonical forms). Techniques for performing parameterized SSTA and computing circuit block setup and hold times in statistical parameterized form are well known in the art and, thus, the details are omitted from this specification in order to allow the reader to focus on the salient aspects of the disclosed embodiments.

The statistical timing analysis tool 730 can further formulate (i.e., can be adapted to formulate, configured to formulate, programmed to formulate, etc.), based on the interdependence between setup time margin and hold time margin of the circuit block and in statistical parameterized form, a setup time constraint and a hold time constraint for the circuit block within the circuit. Specifically, as discussed in detail above with regard to process 310 of the method embodiment of FIG. 3, the timing analysis tool 730 can define (i.e., can be adapted to define, configured to define, programmed to define, etc.) a satisfiability region where setup time and hold time constraints for the circuit block are satisfied (see region 600 of FIG. 6). This satisfiabiltiy region 600 can be defined, for example, by formulating a set of inequalities between the variables (i.e., $T_{S,1}$, $T_{H,1}$, $T_{S,2}$, $T_{H,2}$, $T_{H,0}$ and k) of the piece-wise linear function.

The timing analysis tool 730 can further check (i.e., can be adapted to check, configured to check, programmed to check, etc.) the setup time and hold time determined during the SSTA against the setup time constraint and the hold time constraint to determine, for example, if the setup time constraint and hold time constraint are violated or not and to what degree, see the detailed discussion above with regard to process 312 of the method embodiment of FIG. 3.

The yield calculator 735 can determine (i.e., can be adapted to determine, configured to determine, programmed to determine, etc.) timing yield. That is, the yield calculator 735 can determine the probability that the setup and hold timing constraints will be satisfied by a circuit manufactured according to the design, as discussed in detail above with regard to process 314 of the method embodiment of FIG. 3. Finally, the design tool 740 can make (i.e., can be adapted to make, configured to make, programmed to make, etc.) design changes, if necessary, to enhance the probability that the setup and hold timing constraints will be satisfied, as discussed above with regard to process 316 of the method embodiment of FIG. 3.

One technique that can be used by the timing analysis tool 730 for checking the setup time and hold time against the corresponding constraints is to compute a combined statistical parameterized setup and hold timing slack for the setup time constraint and the hold time constraint, as discussed in detail above with regard to process step 313. Specifically, to check the actual setup and hold times against the setup and hold time constraints, a combined statistical parameterized setup and hold timing slack for the setup time constraint and the hold time constraint can be computed and used as opposed to separate setup and hold slacks. That is, a combined statistical parameterized setup and hold timing slack can be used to determine if the constraints are violated or not violated and also the degree to which they are either violated or not violated. A negative combined timing slack will indicate a non-functioning circuit block and also how much the setup time and/or the hold time must be improved, by design, to create a functioning circuit block. Contrarily, a positive combined timing slack will indicate a functioning circuit block and also how much the setup time and/or hold time can be made worse, by design (e.g., to save cost, power, etc.), without resulting in a non-functioning circuit block.

Such a combined statistical parameterized setup and hold timing slack can also be used for various other purposes. For example, the yield calculator 735 can use (i.e., can be adapted to use, configured to use, programmed to use, etc.) the combined statistical parameterized setup and hold timing slack to determine timing yield, as discussed in detail above with regard to process 314 of the method embodiment of FIG. 3. That is, it can be used to compute the probability that the setup and hold timing constraints will be satisfied. The combined statistical setup and hold timing slack, particularly when expressed in linear parameterized form, can also be used by the design tool 740 for subsequent circuit analysis, design and optimization, as discussed in detail above with regard to process step 316 of the method embodiment of FIG. 3.

Also disclosed herein are embodiments of a non-transitory program storage device. This program storage device can be readable by a computer and can tangibly embody a program of instructions executable by the computer to perform the above-described method for performing a parameterized statistical static timing analysis (SSTA) of an integrated circuit taking into account setup and hold margin interdependence. Specifically, as will be appreciated by one skilled in the art, aspects of the embodiments herein may be embodied as a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in one or more computer readable medium(s) having computer readable program code embodied thereon.

Any combination of one or more computer readable medium(s) may be utilized. The computer readable medium may be a non-transitory computer readable storage device or a computer readable signal medium. A non-transitory computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electro-magnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
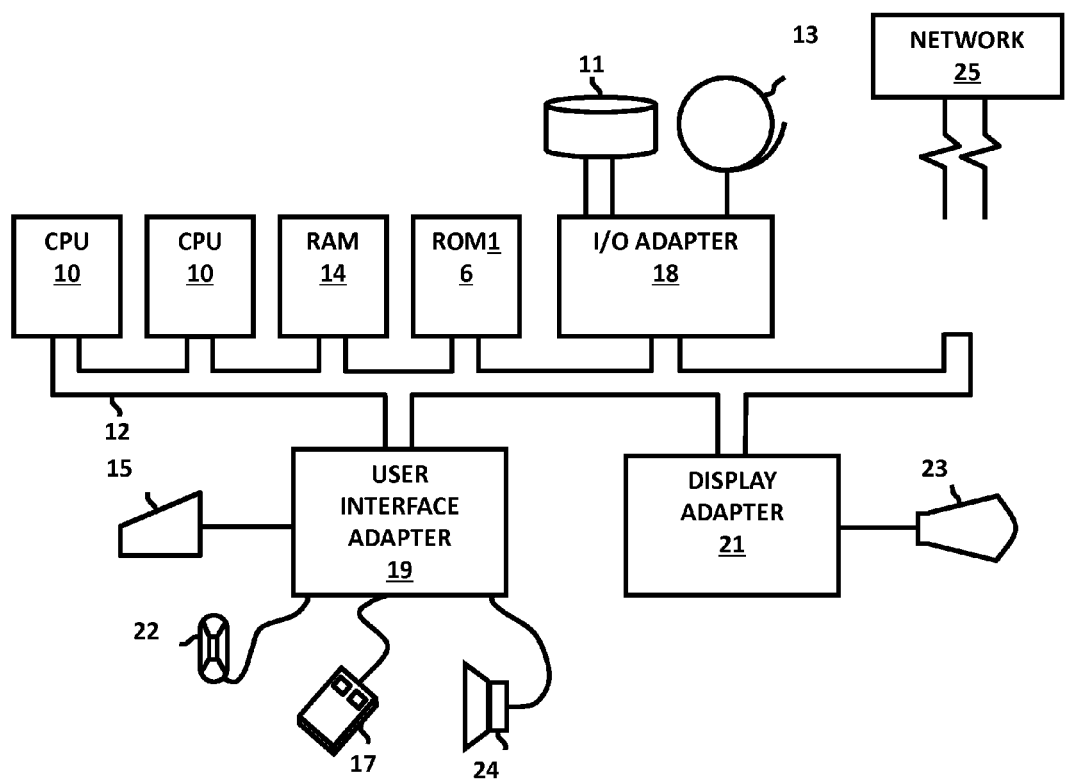
FIG. 8 is a schematic diagram illustrating a representative hardware environment for practicing the disclosed method, system and program storage device embodiments.

As mentioned above, a representative hardware environment for practicing the disclosed method, system and program storage device embodiments is depicted in FIG. 8. This schematic drawing illustrates a hardware configuration of an information handling/computer system in accordance with the disclosed embodiments. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the disclosed embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments above have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are embodiments of a method for performing a parameterized statistical static timing analysis (SSTA) of an integrated circuit taking into account setup and hold margin interdependence as well as embodiments of an associated system and a program storage device. In these embodiments, more optimistic and more accurate (i.e., less pessimistic) time constraints for a circuit block, which requires checking of setup and hold timing constraints (e.g., a latch, flip-flop, clock gating block, register, static memory, dynamic memory, etc.), are established based on the interdependence between the setup time margin and hold time margin. Specifically, the interdependence between the setup and hold time margins of a circuit block can be determined (e.g., characterized, measured, modeled, etc.) in parameterized statistical form so as to take into account possible variations in multiple parameters (e.g., multiple process, environmental and other parameters affecting circuit performance). A parameterized statistical static timing analysis (SSTA) of a circuit incorporating the circuit block can be performed in order to determine, in parameterized statistical form, setup and hold times for the circuit block. Furthermore, based on the interdependence between the setup and hold time margins, setup and hold time constraints can be determined for the circuit block within the circuit. The setup and hold time constraints can also be in parameterized statistical form. The setup and hold times determined during the SSTA can be checked against the setup and hold time constraints to determine, for example, if the time constraints are violated or not and to what degree. Finally, timing yield, circuit optimization, etc. can be performed. One technique for checking the setup and hold times against the setup and hold time constraints is to compute a combined setup and hold timing slack in statistical parameterized form, taking into account both the dependence of setup and hold times on process and environmental variations and the interdependence of setup and hold time margins. This combined statistical parameterized setup and hold timing slack can also be used for various other purposes (e.g., to determine timing yield, to perform circuit optimization, etc.).

What is claimed is:

1. A method for performing a parameterized statistical static timing analysis, said method comprising:
    determining an interdependence between a setup time margin and a hold time margin of a circuit block in statistical parameterized form,
        said setup time margin comprising a first specific period of time immediately prior to arrival at said circuit block of an active edge of a clock signal input during which a data signal input at said circuit block must be stable,
        said hold time margin comprising a second specific period of time immediately after said arrival of said active edge during which said data signal input must continue to remain stable, and
        said determining considering variations in multiple parameters;
    performing, by a computer system, a parameterized statistical static timing analysis of a circuit comprising said circuit block;
    based on said parameterized statistical static timing analysis, determining, by said computer system and in statistical parameterized form, a setup time and a hold time for said circuit block in said circuit;
    based on said interdependence between said setup time margin and said hold time margin, formulating, by said computer system and in statistical parameterized form, a setup time constraint and a hold time constraint for said circuit block in said circuit; and,
    checking, by said computer system, said setup time and said hold time against said setup time constraint and said hold time constraint.

2. The method of claim 1, said multiple parameters comprising any of process parameters, environmental parameters, and other parameters affecting circuit performance.

3. The method of claim 1, said determining of said interdependence comprising characterizing said interdependence and said characterizing comprising, for each parameter:
    setting a value of said parameter to a selected starting corner value associated with a starting corner;

characterizing said interdependence as a piece-wise linear function using said selected starting corner value;

changing said value to a different value associated with a different corner;

characterizing said interdependence as said piece-wise linear function using said different value;

determining sensitivities of variables in said piece-wise linear function to said changing of said value; and based on said sensitivities, computing linear parameterized forms of said variables.

4. The method of claim 3, said piece-wise linear function comprising multiple line segments indicating said interdependence between said hold time margin and said setup time margin.

5. The method of claim 3, said piece-wise linear function comprising:

a vertical portion indicating that said setup time margin remains constant when said hold time margin is greater than a given hold time;

a horizontal portion indicating that said hold time margin remains constant when said setup time margin is greater than a given setup time; and an angled portion connected at one end to said vertical portion and at an opposite end to said horizontal portion, said angled portion indicating a decrease in said hold time margin as a function of an increase in said setup time margin between a minimum setup time and said given setup time.

6. The method of claim 3, said formulating, in statistical parameterized form, of said setup time constraint and said hold time constraint for said circuit block comprising defining said setup time constraint and said hold time constraint based on said piece-wise linear function by formulating a set of parameterized inequalities between said variables and, thereby defining a parameterized satisfiability region.

7. The method of claim 1, further comprising:

computing a combined statistical parameterized setup and hold timing slack for said setup time constraint and said hold time constraint; and using said combined statistical parameterized setup and hold timing slack for said checking of said setup time and said hold time against said setup time constraint and said hold time constraint.

8. The method of claim 7, further comprising at least one of the following:

determining timing yield based on said combined statistical parameterized setup and hold timing slack; and performing circuit optimization based on said combined statistical parameterized setup and hold timing slack.

9. A computer system for performing a parameterized statistical static timing analysis, said computer system comprising:

a memory storing a design of a circuit block; and at least one processor comprising at least a timing analysis tool performing the following:

performing a parameterized statistical static timing analysis of a circuit comprising said circuit block;

determining, in statistical parameterized form and based on said parameterized statistical static timing analysis, a setup time and a hold time for said circuit block in said circuit;

formulating, in parameterized form and based on a previously-determined interdependence between a setup time margin and a hold time margin of said circuit block in statistical parameterized form, a setup time constraint and a hold time constraint for said circuit block in said circuit, said setup time margin and said hold time margin being previously determined based on variations in multiple parameters, said setup time comprising a first specific period of time immediately prior to arrival at said circuit block of an active edge of a clock signal input during which a data signal input at said circuit block must be stable, and said hold time margin comprising a second specific period of time immediately after said arrival of said active edge during which said data signal input must continue to remain stable; and, checking said setup time and said hold time against said setup time constraint and said hold time constraint.

10. The computer system of claim 9, said multiple parameters comprising any of process parameters, environmental parameters, and other parameters affecting circuit performance.

11. The computer system of claim 9, said at least one processor further comprising:

a characterization tool characterizing said interdependence between a setup time margin and a hold time margin of said circuit block in statistical parameterized form, said characterizing considering variations in multiple parameters and comprising the following, for each parameter:

setting a value of said parameter to a selected starting value associated with a starting corner;

characterizing said interdependence as a piece-wise linear function using said selected starting value;

changing said value to a different value associated with a different corner;

characterizing said interdependence as said piece-wise linear function using said different value;

determining sensitivities of variables in said piece-wise linear function to said changing of said value; and based on said sensitivities, computing linear parameterized forms of said variables.

12. The computer system of claim 11, said piece-wise linear function comprising multiple line segments indicating said interdependence between said hold time margin and said setup time margin.

13. The computer system of claim 11, said piece-wise linear function comprising:

a vertical portion indicating that said setup time margin remains constant when said hold time margin is greater than a given hold time;

a horizontal portion indicating that said hold time margin remains constant when said setup time margin is greater than a given setup time; and an angled portion connected at one end to said vertical portion and at an opposite end to said horizontal portion, said angled portion indicating a decrease in said hold time margin as a function of an increase in said setup time margin between a minimum setup time and said given setup time.

14. The computer system of claim 11, said formulating, in statistical parameterized form, of said setup time constraint and said hold time constraint for said circuit block by said timing analysis tool comprising defining said setup time constraint and said hold time constraint based on said piece-wise linear function by formulating a set of inequalities between said variables and, thereby defining a satisfiability region.

15. The computer system of claim 9, said timing analysis tool further computing a combined statistical parameterized setup and hold timing slack for said setup time constraint and said hold time constraint and performing said checking of said setup time and hold time against said setup time constraint and said hold time constraint based on said combined statistical parameterized setup and hold timing slack.

16. The computer system of claim 15, said at least one processor further comprising at least one of the following:
   a yield calculator determining timing yield based on said combined statistical parameterized setup and hold timing slack; and
   a design tool performing circuit optimization based on said combined statistical parameterized setup and hold timing slack.

17. A tangible program storage device readable by a computer and storing a program of instructions executable by said computer to perform a method for parameterized statistical static timing analysis, said method comprising:
   determining an interdependence between a setup time margin and a hold time margin of a circuit block in statistical parameterized form,
      said setup time margin comprising a first specific period of time immediately prior to arrival at said circuit block of an active edge of a clock signal input during which a data signal input at said circuit block must be stable,
      said hold time margin comprising a second specific period of time immediately after said arrival of said active edge during which said data signal input must continue to remain stable, and
      said determining considering variations in multiple parameters;
   performing a parameterized statistical static timing analysis of a circuit comprising said circuit block;
   based on said interdependence between said setup time margin and said hold time margin, formulating, in statistical parameterized form, a setup time constraint and a hold time constraint for said circuit block in said circuit; and
   checking said setup time and said hold time against said setup time constraint and said hold time constraint.

18. The program storage device of claim 17, said multiple parameters comprising any of process parameters, environmental parameters, and other parameters affecting circuit performance.

19. The program storage device of claim 17, said determining of said interdependence comprising characterizing said interdependence and said characterizing comprising, for each parameter:
   setting a value of said parameter to a selected starting value associated with a starting corner;
   characterizing said interdependence as a piece-wise linear function using said selected starting value;
   changing said value to a different value associated with a different corner;
   characterizing said interdependence as said piece-wise linear function using said different value;
   determining sensitivities of variables in said piece-wise linear function to said changing of said value; and
   based on said sensitivities, computing linear parameterized forms of said variables.

20. The program storage device of claim 17, said method further comprising:
   computing a combined statistical parameterized setup and hold timing slack for said setup time constraint and said hold time constraint; and
   using said combined statistical parameterized setup and hold timing slack for any of the following: said checking of said setup time and said hold time against said setup time constraint and said hold time constraint; determining timing yield; and performing circuit optimization.

* * * * *